Oct. 21, 1958     R. R. SIMPSON     2,857,570

MULTI-RANGE ELECTRICAL TEST INSTRUMENT

Filed March 6, 1956     2 Sheets-Sheet 1

INVENTOR.
RAY R. SIMPSON

BY Robert of Wendt

ATTY.

Oct. 21, 1958      R. R. SIMPSON      2,857,570

MULTI-RANGE ELECTRICAL TEST INSTRUMENT

Filed March 6, 1956      2 Sheets-Sheet 2

INVENTOR.
RAY R. SIMPSON
BY
ATTY.

United States Patent Office 2,857,570
Patented Oct. 21, 1958

2,857,570
MULTI-RANGE ELECTRICAL TEST INSTRUMENT

Ray R. Simpson, St. Petersburg, Fla., assignor to American Gage & Machine Company, Chicago, Ill., a corporation of Illinois Application March 6, 1956, Serial No. 569,851

4 Claims. (Cl. 324—115)

The present invention relates to combination test leads and selector knob for multi-range meters, and is particularly concerned with multi-range meters of the type having a rotary switch and test leads which are to be selectively connected to different circuits of the multi-range meter.

One of the objects of the invention is the provision of an improved multi-range meter structure having a rotary switch which is substantially flush with the housing of the meter, so that the rotary switch has no protruding parts that can be damaged.

Another object of the invention is the provision of an improved multi-range meter having a rotary switch, the face of which is substantially flush with the housing so that it can only be actuated by applying the test leads which terminate in a selector knob carrying connector prongs insertable in the plug which is the movable part of the rotary switch.

Another object of the invention is the provision of improved combination test leads and selector switch actuator knob in which the connectors carried by the knob are so arranged that they cannot be inserted except in the part of the rotary switch for which they are intended.

Another object of the invention is the provision of improved test leads and rotary switch structures which are simpler than the devices of prior art, it may be manufactured more cheaply, which have fewer parts and which can only be used in combination, one with the other.

Another object of the invention is the provision of improved test lead and switch arrangements for multi-range meters which are so constructed that the test leads must be inserted in the proper holes or sockets to assure the proper polarity of the meter in the circuit and the provision of improved arrangements for accomplishing this result with prongs of different size and or prongs of the same size and alignment lug and socket.

Other objects and advantages of the invention will be apparent from the following description and the accompanying drawings, in which similar characters of reference indicate similar parts throughout the several views.

Referring to the drawings of Fig. 1, which is a view in perspective of the combination test leads and selector with the multi-range meter prior to assembly.

Figure 1:
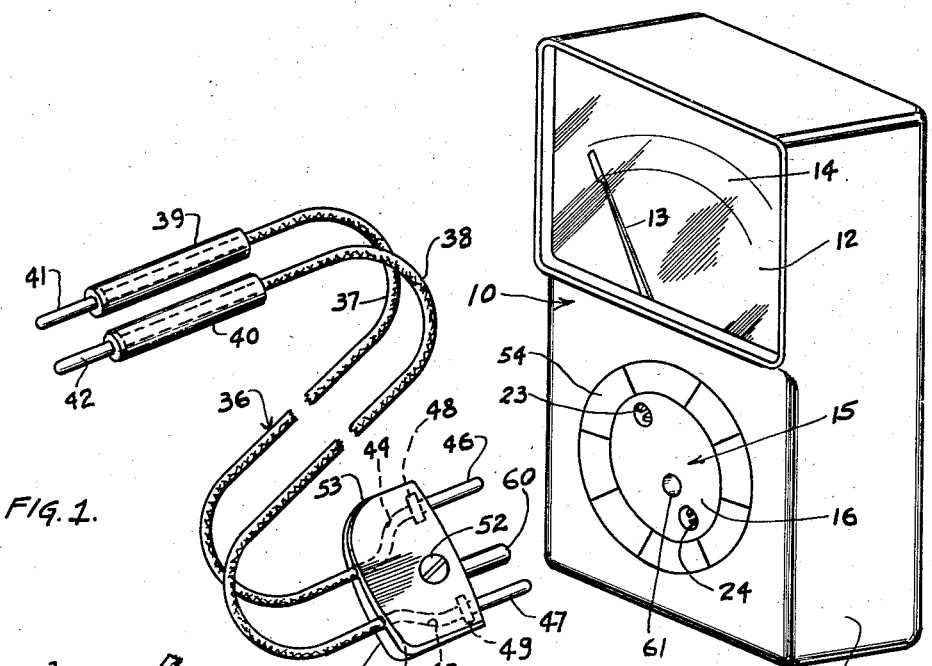
Figure 2:
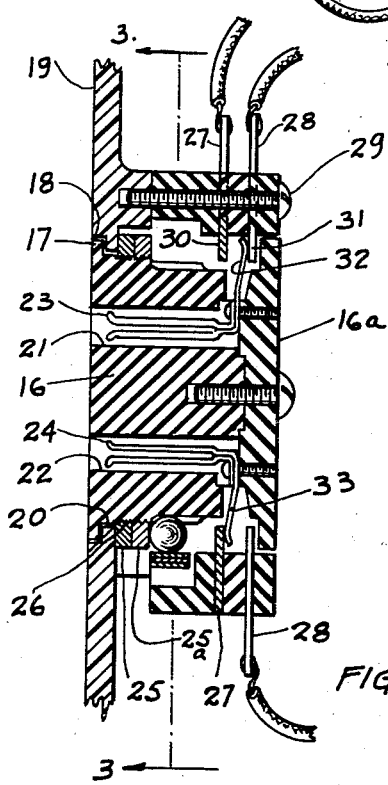
Fig. 2 is a sectional view showing the selector knob assembly with the multi-range meter.
Figure 3:
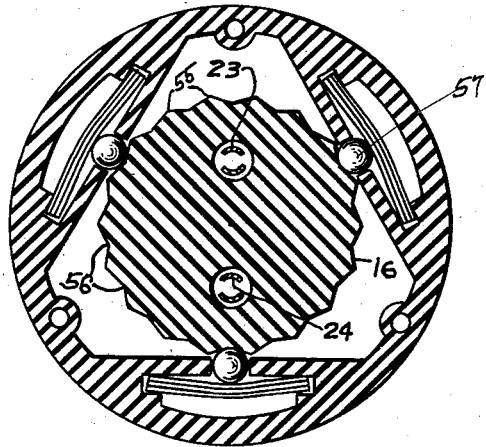
Fig. 3 is a fragmentary sectional view of one form of rotary switch arrangement, taken on the line 3—3 of Fig. 2, looking in the direction of the arrows.

Referring to Figs. 1 and 2, 10 indicates a multi-range meter enclosed in an insulating housing 11 provided with a window 12 for exposing the pointer 13 and scale 14.

The multi-range meter may be of the type covered by prior Patent No. 2,509,415 having a plurality of scales and a plurality of positions for a rotary switch 15 of the type described in Patent No. 2,447,718 issued to Ray R. Simpson, August 24, 1948.

The rotary switch 15 may consist of a cylindrical insulating body 16 which is provided with a radial flange 17 adapted to be received in a recess 18 in the panel 19, surrounding a cylindrical opening 20.

The rotary switch body 16 may have a pair of bores 21, 22, each of which has therein a pair of resilient contacts 23, 24 for reception of conducting prongs.

The switch body 16 may be rotatably mounted in the bore 20 where it is secured by a pair of lock nuts 24, 25 mounted on the threaded portion 26 of the body leaving sufficient clearance for rotation of the body 16.

A plurality of switch units 27, 28 may have their bodies assembled on a pair of screw bolts 29 and may have fixed contacts 30, 31 for engagement with a pair of rotors 32, 33 that are keyed to the body 16 to rotate with it, carrying movable contacts 34, 35 that control the connection of the test leads, further to be described, to the various ranges of the meter.

The combined test leads and selector knob are indicated in their entirety at 36, including a pair of flexible multi-wire conductors 37, 38 each of which has a flexible rubber or plastic insulating covering.

At one end the insulating wires 37, 38 are inserted into the rigid insulating sleeves 39, 40 which carry the rigid metal connector prong 41, 42 to which the conductors are connected by soldering.

At the other end the insulating conductors 37, 38 extend into the curved channels 43, 44, formed in the selector knob 45 and terminating at the rigid metal connector prong 46, 47.

The connector prongs 46, 47 may have rigid anchoring members 48, 49 held in complementary grooves in the two halves 50, 51 of the selector knob 45, where the prongs are anchored and electrically connected to the conductors 37, 38.

The two halves 50, 51 are held in alignment by the anchoring formations 48, 49 and a single threaded screw bolt 52 passing through one half and threaded into the other half of the selector knob or provided with an embedded nut.

The operation of the assembly is as follows:

The rotary switch body 16 being flush with the front of the housing 11, it has no projecting parts by means of which it may be rotated. It is adapted to receive the prongs 46, 47 which are connected to the test leads and mounted in the selector knob.

The selector knob has a knife edge at 53 which serves as a pointer for registry with the indicia on the scale 54 of the switch 15 when the prongs 46, 47 are inserted in the apertures 21, 22 engaging the resilient contacts 23, 24.

The selector knob is adapted to be assembled with the switch. The switch may be turned to the proper point to use the range desired and simultaneously the connector leads are connected by the switch to the electrical instrument leads for that range of the instrument.

The selector knob 53 is preferably provided with a molded off center lug 60 when the prongs are of the same size, the lug fitting into an off center aperture 61 in the switch body 15 to make it necessary that the prongs shall be inserted in the proper apertures so that the meter will read forwardly on its scale.

Figure 4:
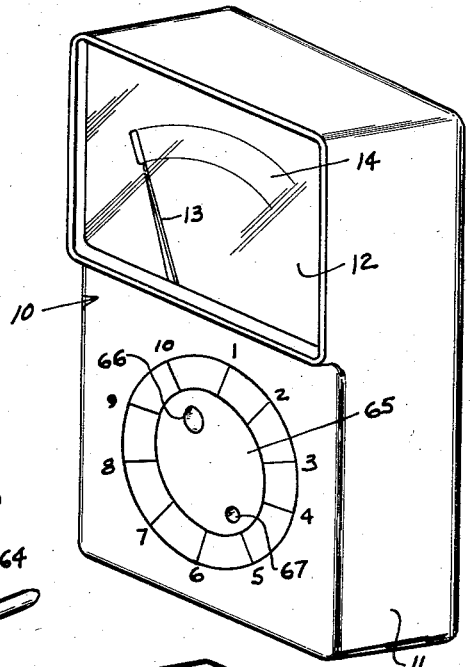
Fig. 4 is a fragmentary view in perspective of a modification in which a large prong and a small prong are employed to assure proper connections between the switch and leads.
Figure 4:
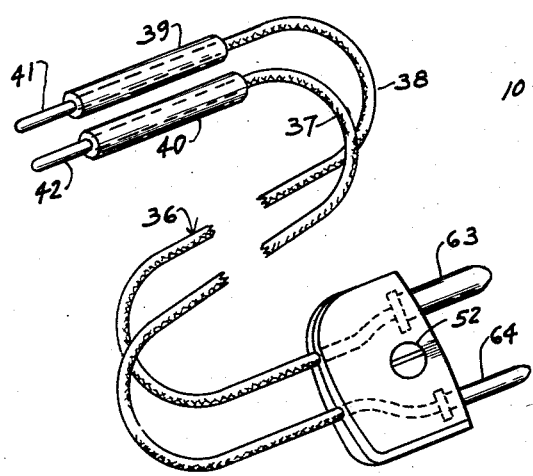

Referring to Fig. 4, this is a modification in which the selector knob 62 is provided with one large prong 63 and one small prong 64 for cooperating with a switch actuating member 65, having one large socket 66 for prong 63 and one small socket 67 for cooperation with prong 64. With this arrangement of parts, all of the other details of construction may be the same; but it would be impossible to so connect the leads that they would have the wrong polarity, such as to cause a backward reading on the meter.

Figure 5:
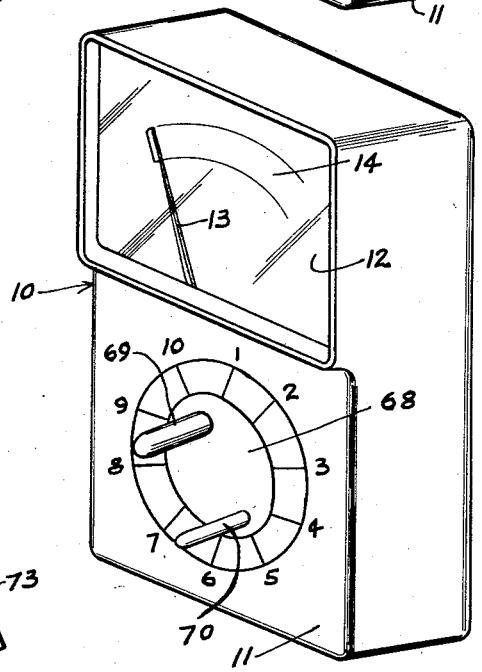
Fig. 5 is another fragmentary view in perspective, showing the arrangement of the parts when the prongs are on the switch and the prong sockets are on the switch handle.
Figure 5:
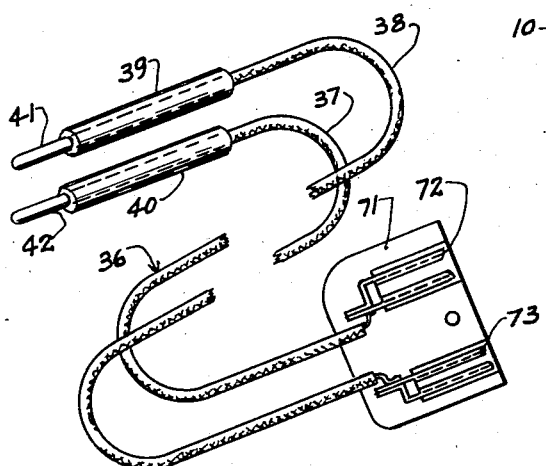

Referring to Fig. 5, this is a view similar to Fig. 1 of a modification in which the switch member is provided with one large prong 69 and one small prong 70 for cooperation with a selector knob 71, having one large socket 72 for receiving large prong 69 and one small socket 73 for receiving small prong 70.

It should also be understood that when the selector knob 53 is provided with the off center lug 60, it may also be constructed with a single prong, in the event a common connection is provided elsewhere, and only one prong is required.

The switch cannot be actuated except by using proper test leads having connection prongs mounted on a selector knob. The user is thus assured that the meter will be employed with low resistance test leads which are properly insulated for safety and adapted to be used for high accuracy electrical measurements.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, which I claim as new and desire to secure by Letters Patent of the United States, is:

1. A multiple-range electrical test instrument comprising, in combination, a housing having a panel, said panel being provided with a circular aperture, a meter mounted in said housing, a switch body fixedly mounted on the inner side of said panel surrounding said aperture, said switch body having a plurality of fixed contacts arranged in at least one circular bank, a switch rotor rotatably mounted on said panel within said aperture coaxially of said switch body, said switch rotor having a front face substantially flush with the front face of said panel and carrying at least one radially extending arm positioned for cooperative switching action with said fixed contacts, said switch rotor also having in its front face a pair of openings and a pair of female electric contacts mounted on its rear side directly behind said openings, a male connector plug adapted to mate with the front face of said switch rotor and having a pair of male contact prongs fixedly spaced to enter said openings and to make electrical connection with said female contacts, and a pair of insulated test leads having test prods at one end, the other end of said pair of test leads being secured within said male connector plug and being respectively connected to said prongs, said male plug being formed to provide convenient manual means for rotating said switch rotor when said prongs are inserted within said female contacts.

2. A multiple-range electrical test instrument according to claim 1 wherein one of said prongs and one of said openings is larger in cross section than the other of said prongs and said openings.

3. A multiple-range electrical test instrument according to claim 1 wherein one of said prongs and one of said openings are respectively differently shaped than the other of said prongs and the other of said openings, whereby said prongs may be inserted in said openings in only a single relative position.

4. A multiple-range electrical test instrument according to claim 1 having additional means on said male plug and said switch rotor permitting said plug and rotor to mate together in only one relative position.

References Cited in the file of this patent

UNITED STATES PATENTS

| | | |
|---|---|---|
| 1,669,666 | Laub | May 15, 1928 |
| 2,547,248 | Bartholomew | Apr. 3, 1951 |
| 2,558,276 | Simpson | June 26, 1951 |